United States Patent [19]

Fritsch

[11] 4,160,558
[45] Jul. 10, 1979

[54] CARRIER FRAME FOR MOBILE CRANE

[75] Inventor: Robert A. Fritsch, Cedar Rapids, Iowa

[73] Assignee: Harnischfeger Corporation, W. Milwaukee, Wis.

[21] Appl. No.: 843,486

[22] Filed: Oct. 19, 1977

[51] Int. Cl.² .................................................. B62D 21/00
[52] U.S. Cl. ........................................................ 280/797
[58] Field of Search ............... 212/59 R, 145; 280/781, 280/797

[56] References Cited

U.S. PATENT DOCUMENTS

| | | | |
|---|---|---|---|
| 2,653,829 | 9/1953 | Sheehan | 280/797 |
| 3,622,171 | 11/1971 | Gottschalk | 280/797 |
| 4,059,170 | 11/1977 | Young | 280/797 |

Primary Examiner—Robert G. Sheridan
Attorney, Agent, or Firm—James E. Nilles

[57] ABSTRACT

The principal load-bearing section of the carrier frame for a mobile crane has a rotatable crane upper mounted near its center and has extendable and retractable outriggers mounted near its opposite ends. The load-bearing section comprises longitudinally extending steel plates which are welded together to provide a pair of longitudinally extending interconnected horizontally spaced apart hollow beams. The beams, which have a common top plate, each have a bottom plate, a vertical outer side plate and a sloped inner side plate, which side plates are connected between the top and bottom plates and subjected to shear under load. The top plate is in compression and the bottom plate is in tension. The inner plates are slanted so as to provide more effective area for the top compression plate so as to provide a thinner, and therefore lighter, plate. The top edge of each sloped inner side plate is attached to the underside of the common top plate at a location which is spaced in optimum distance from the longitudinal centerline of the frame. The plates are sized, shaped, and located so as to provide a load-bearing section having maximum strength and minimum weight, taking into consideration plate thicknesses and overall frame size. The load-bearing section of the frame is strong, compact, lightweight, buckle-resistant under loads, and well-suited for mounting components thereon.

13 Claims, 15 Drawing Figures

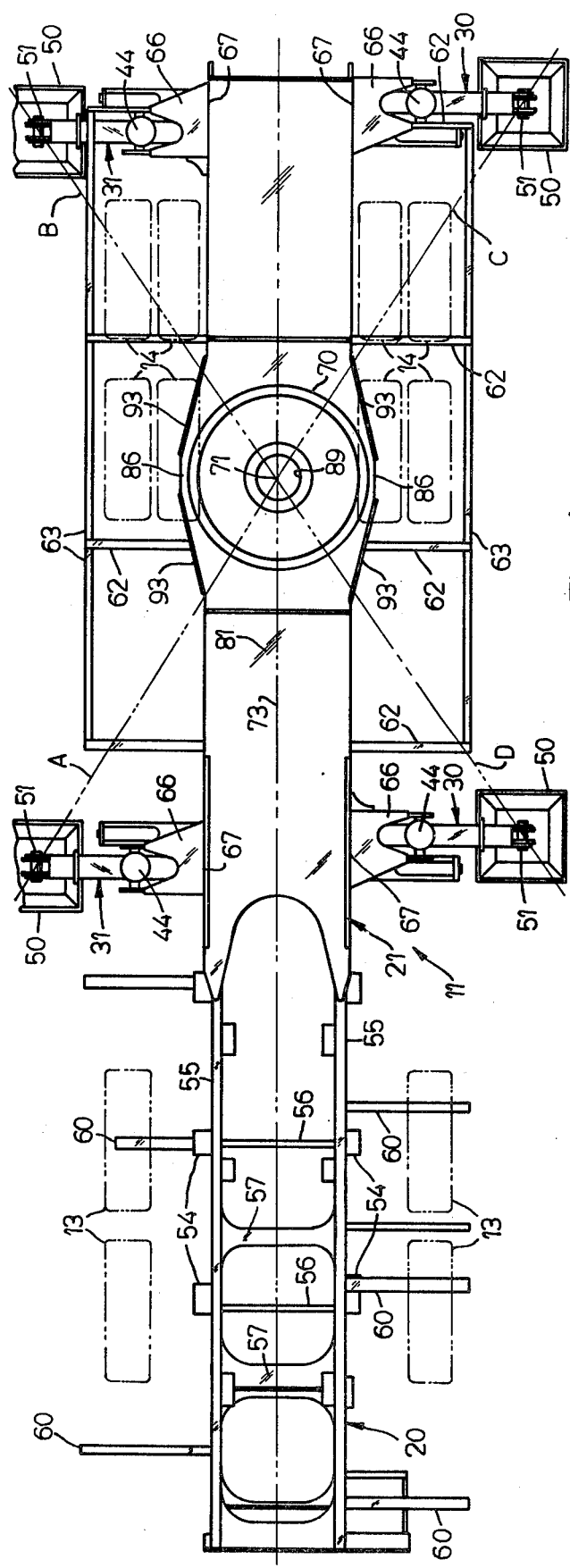
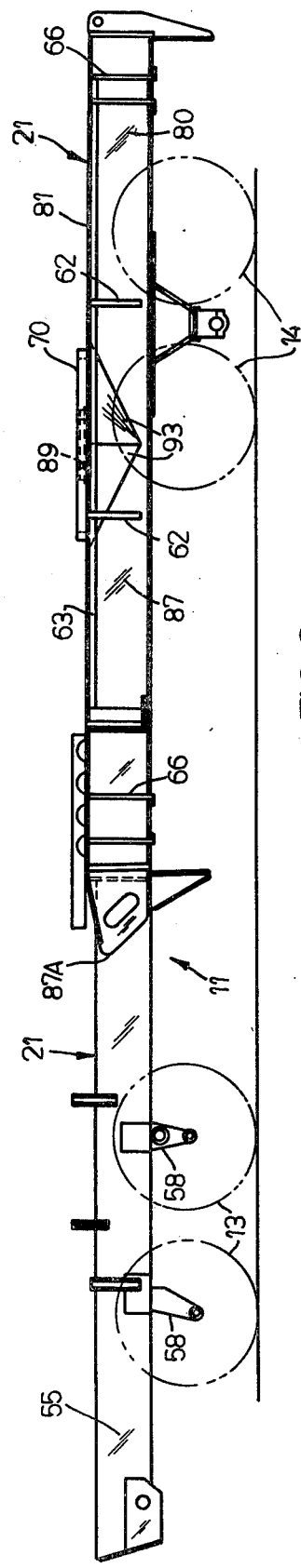
FIG. 4
FIG. 3

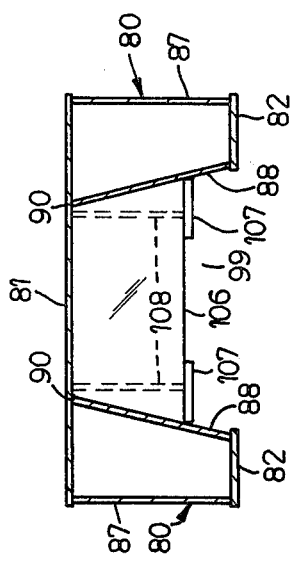
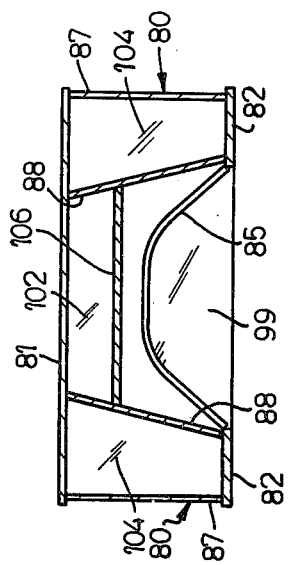
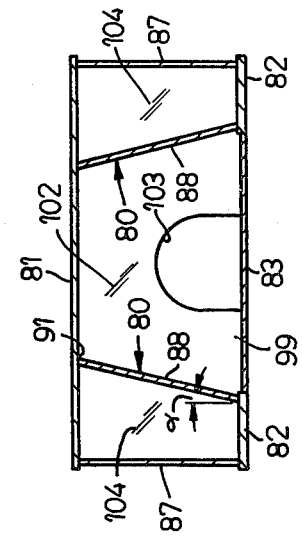
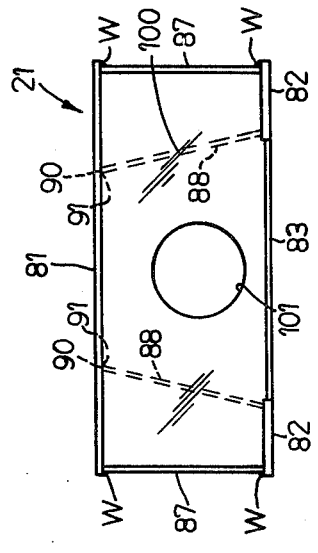
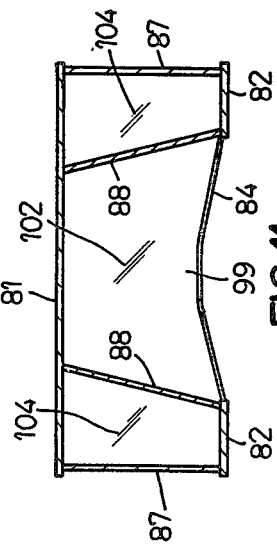
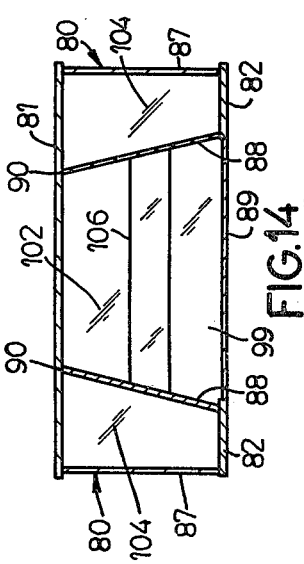
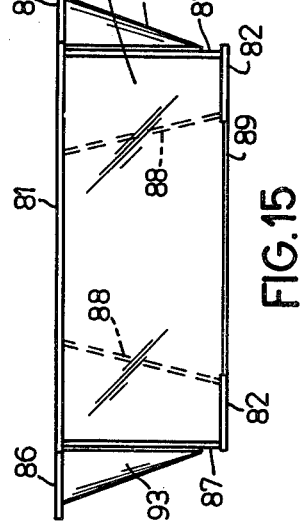

CARRIER FRAME FOR MOBILE CRANE

BACKGROUND OF THE INVENTION

1. Field of Use

This invention relates generally to carrier frames for vehicles. In particular, it relates to a carrier frame for a vehicle, such as a mobile crane or the like, which has apparatus such as a crane upper mounted thereon and which is supported during use by outriggers.

2. Description of the Prior Art

The prior art discloses various types of carrier frames for vehicles and the state of the art is disclosed in U.S. Pat. Nos. 3,945,666; 3,902,734; 3,759,540; 3,622,171; 3,528,678; 3,392,988; and 3,319,975. In particular, U.S. Pat. No. 3,622,171 discloses a vehicle frame for a mobile crane formed of longitudinally extending plates which define a hollow frame of inverted U-shaped cross section and having lateral re-enforcements spaced longitudinally along the frame. As the size and weight of mobile cranes and the loads to be handled thereby increase, it is necessary that the carrier frames be made stronger and more deflection resistant. On the other hand, the larger carrier frames must not become unduly heavy or unduly difficult and costly to construct.

Carrier frames of the mobile type that are subjected to heavy axial and overturning moments imposed by the turntable bearing for the crane mounted thereon have required strong heavy side sill or frame members to take the bending and torsional loads. These side sills have been of various types, including: two laterally spaced apart vertical channels connected by a horizontal top plate; two laterally spaced apart vertical wide-flange beams connected by a horizontal top plate; or two laterally spaced apart hollow parallel-sided fabricated boxes, the horizontal top plate of which may be integral with the two boxes. The aforementioned channel and wide flange beam sills are not balanced sections and have limited torsional strength. The aforementioned type using two hollow parallel-sided boxes with an integral top plate is a considerably more effective section, because it allows freedom to change the thickness or strength of each individual plate in order to suit a particular design. The shortcoming of the last-mentioned type, however, is that the top plate becomes needlessly heavy because of the large span between the two boxes forming the side sills and, in order to obtain a sufficiently strong top plate, the top plate has to be relatively thick.

SUMMARY OF THE PRESENT INVENTION

In accordance with the present invention, there is provided a carrier frame for a vehicle such as a mobile crane or the like. The carrier frame, which, for example, comprises a forward section and a load-bearing rear section, is adapted to have apparatus, such as a rotatable crane upper, mounted near the center of the load-bearing section and extendable and retractable outriggers mounted near the opposite ends of the load-bearing section. The load-bearing frame section comprises longitudinally extending steel plates which are welded together to provide a pair of longitudinally extending interconnected hollow beams which are horizontally spaced apart from each other and located on opposite sides of the longitudinal centerline of the carrier frame. More specifically, the load-bearing section of the carrier frame comprises a single horizontal top plate and a pair of horizontal bottom plates which are located below the top plate and horizontally spaced apart from each other on opposite sides of the longitudinal centerline. The load-bearing section further comprises a pair of horizontally spaced apart vertical outer side plates, one on each side of the centerline, and a pair of horizontally spaced apart vertically sloped inner side plates, one on each side of the centerline and both located between the pair of outer side plates. Each beam comprises a portion of the top plate, a bottom plate, one vertical outer side plate, and one sloped inner side plate. The side plates are connected by welding between the top plate and their associated bottom plate for edge compression when loaded. The top edge of each vertically sloped inner side plate is connected to the underside of the top plate at a location which is spaced an optimum distance from the longitudinal centerline of the carrier frame. Bulkheads are located between and within the beams at various longitudinal positions along the load-bearing section of the frame. The two bottom plates are also rigidified by sheet steel webs edge-welded therebetween.

This arrangement ensures an optimum balance between the strength, size, and weight of the plate material of the frame in view of the overall size and weight of the load-bearing section of the carrier frame. The arrangement provides a strong, light-weight carrier frame resistant to buckling under load and having a flat horizontal upper surface well suited for mounting components thereon, flat vertical side surfaces well suited to receive components, such as wheels, closely thereagainst, and a longitudinally extending center space between the beams and beneath the top plate within which components, such as the transmission drive line, pumps, tanks, valves, and hoses can conveniently be mounted.

In addition to the foregoing advantages, a carrier frame in accordance with the present invention resists deflection and remains substantially level during operation. Furthermore, the top plate of the frame and the vertical outer side plates, as well as the sloped inner side plates, are in edge compression when the carrier frame is subjected to loads and therefore tend to resist buckling. The top edges of the sloped inner side plates are not connected to the top plate at the longitudinal centerline of the frame but are spaced at an optimum lateral distance from the longitudinal centerline so as to allow a maximum space between the hollow beams for location of the system components, while still providing sufficient support for the top plate to prevent buckling of the top plate even under the worst loaded condition of the carrier frame.

Tests and calculations show that a carrier frame in accordance with the invention is slightly lighter and substantially stronger in section modulus than a carrier frame of similar size which employs only a single vertical side plate between the top plate and a bottom plate because the single side plate must be relatively thick to resist buckling. A carrier frame in accordance with the invention is substantially lighter and only slightly less strong in section modulus than a carrier frame employing a pair of vertical side plates between the top plate and a bottom plate because four relatively thick vertical side plates are required.

It is an object of this invention to provide a carrier frame having a thinner top plate, having a greater effective width, and which is lighter and stronger while providing more torsional resistance.

Each hollow beam section to be optimized for bending and torsional strength has its centroidal, or neutral, axis approximately equidistant from the extreme top and bottom plates of the hollow section. This, then, makes the compression stress in the top plate and the tension stress in the bottom plate approximately equal for a given bending load.

The top plate is made thin so as to save weight and is used to tie the two hollow frames together at the top. This provides a protective covering and mounting surface for the turntable bearing for the crane mounted thereon. The top plate is used also as a walking surface. The full width of the top plate, however, is not necessarily fully effective as a compression member in edge compression because it is necessarily wide so as to provide room for drive train components and hydraulic and air lines and fittings, but is limited in width by tire clearance.

The bottom tension members, however, do not have a bottom tie plate connecting them, except for several transverse bulkheads arched to define openings to clear the drive train and keep the two hollow beams from separating. These openings allow ready access to the drive train components and hydraulic and air lines and other fittings of the crane. The bottom tension member may therefore be narrow and thick so as to provide the widest access openings for the above-mentioned components.

In order to obtain an optimized section wherein the top plate and bottom plate areas are effectively equal, it is necessary to provide that the top edge of a vertically sloped or slanted inner plate be fastened to the top plate substantially nearer the center of the frame than the point where the lower edge of the vertically slanted inner plate fastens to the bottom tension plate.

Since the bottom plate is in tension, there is, of course, no buckling phenomenon to effect the structural integrity. The top plate may buckle due to edge compression before reaching the yield point of the material, depending on its thickness and the distance between its unsupported edges. This theoretical thickness and distance is governed by the formula:

$$aCR = \frac{K\pi^2 E}{12(1 - U^2)} \left(\frac{t}{b}\right)^2$$

where:
K=4.0 (for simply supported edges)
E=29,000,000 psi
U=0.3

Applying this formula to an 80,000 psi material, the unsupported width could be 36.2×the top plate thickness without incipient buckling, or 32.3×the top plate thickness for a 100,000 psi material.

In the remaining center portion of the top plate, some of the portion is effective for compression loads and some of the portion is ineffective. The effective portion is a flange extending beyond the slanted inner plate connection with the top plate and is governed by the formula:

$$aCR = \frac{K\pi^2 E}{12(1 - U^2)} \left(\frac{t}{b}\right)^2$$

where:

K=0.43
E=29,000,000 psi
U=0.3

Applying this formula to an 80,000 psi material, the effective flange width before incipient buckling is 11.8×the plate thickness, and for a 100,000 psi material is 10.6×the plate thickness.

In accordance with the present invention, the top plate is supported some distance less than the point at which incipient buckling occurs, for example, 0.75 b, and add to this member the safe effective flange, for example, 0.75 b, and balance this effective area with a bottom tension area being more narrow and thicker. The weight saving is evident because of the relatively thin top compression plate while allowing a maximum opening in the bottom of the frame for accessability to drive train components due to the narrower, thicker bottom tension members.

If the frame width were sufficiently narrow or the top plate thicker for a given width, the toes of the effective flanges would meet and the top plate would become fully effective.

Conversely, it can be seen that with parallel vertical side plates for the identical bottom flange width, the top plate would become ineffective in the center of the two sills, either for the narrow aforementioned frame with a thin top plate or for the wide frame with a thicker plate. Since the top plate is ineffective it requires more thickness and hence more weight to become an integral part of the section.

The slanted plate also provides more torsional resistance in each side sill due to its greater average width and its trapezoidal shape which minimizes parallelograming of the section. Other objects and advantages of the invention will hereinafter appear.

BRIEF DESCRIPTION OF THE DRAWINGS

FIG. 3 is an enlarged side elevational view of the carrier frame shown in FIGS. 1 and 2 with certain components of the mobile crane removed so as to show details;

FIG. 4 is a top plan view of the carrier frame shown in FIG. 3;

FIG. 8 is a cross-sectional view taken on line 8—8 of FIG. 7;

FIG. 9 is a cross-sectional view taken on line 9—9 of FIG. 7;

FIG. 10 is a cross-sectional view taken on line 10—10 of FIG. 7;

FIG. 11 is a cross-sectional view taken on line 11—11 of FIG. 7;

FIG. 12 is a cross-sectional view taken on line 12—12 of FIG. 7;

FIG. 13 is a cross-sectional view taken on line 13—13 of FIG. 7;

FIG. 14 is a cross-sectional view taken on line 14—14 of FIG. 7; and

FIG. 15 is a cross-sectional view taken on line 15—15 of FIG. 7.

DESCRIPTION OF A PREFERRED EMBODIMENT

Figure 1:
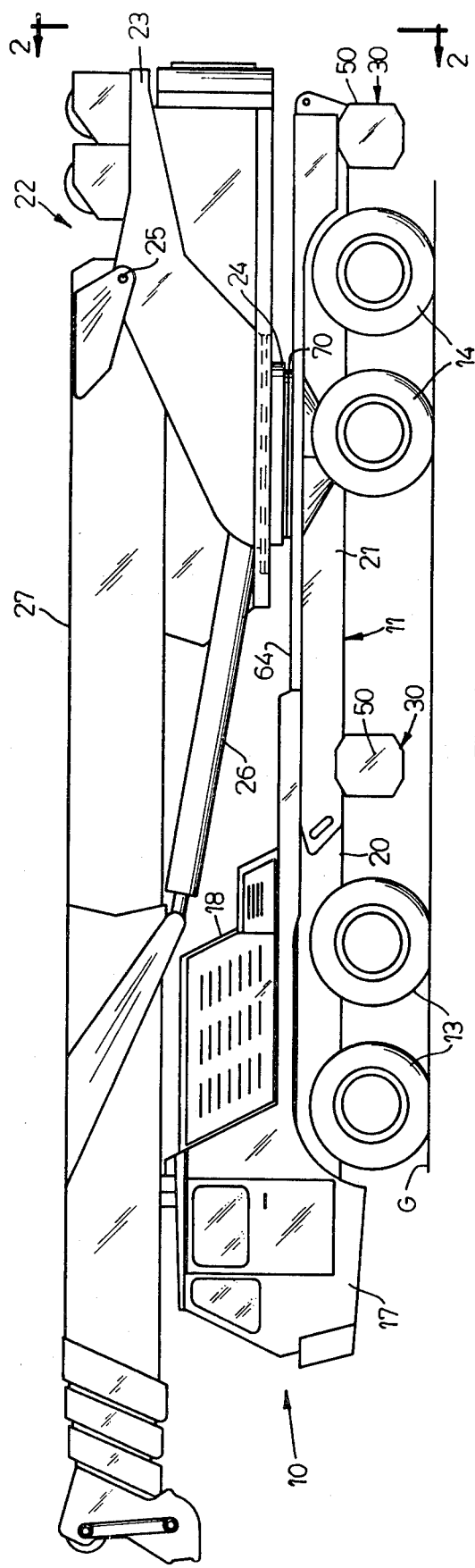
FIG. 1 is a side elevational view of a mobile crane having a carrier frame in accordance with the invention.
Figure 2:
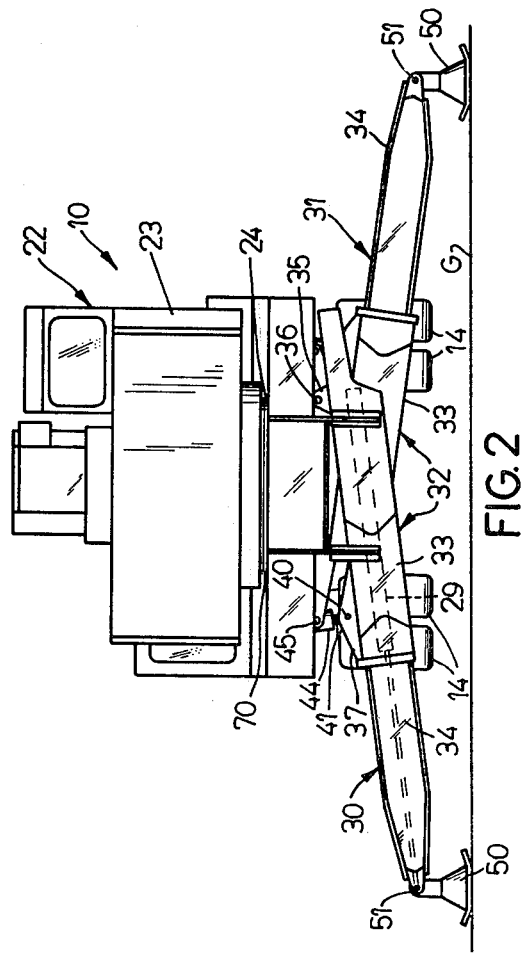
FIG. 2 is an end elevation view taken on line 2—2 of FIG. 1 and showing the mobile crane with its outriggers fully extended and supporting the mobile crane thereon.

Referring to FIGS. 1 and 2, there is shown a mobile crane 10 in accordance with the present invention. Carrier frame 11 generally comprises a forward section 20 and a rear or principal load-bearing section 21. Carrier frame 11 has a set of forward and rear ground-engaging wheels 13 and 14, respectively, which are mounted thereon. A driver's cab 17 and an engine enclosure 18 are mounted at the front end of the carrier frame 11. A conventional crane upper 22 is mounted near the center of load-bearing section 21 of the carrier frame 11. Crane upper includes a framework 23 which is supported on carrier frame 11 for horizontal rotation by a conventional slew ring assembly 24, including a bearing ring 70. Crane upper 22 also includes a telescopic boom 27 which is pivotable in a vertical plane about a point 25 by means of a boom cylinder 26 connected between the framework 23 and the boom 27. Forward and rear outriggers 30 and 31, respectively, are mounted at the front and rear ends of load-bearing section 21 of carrier frame 11. FIG. 1 shows mobile crane 10 in its road transport condition wherein its wheels engage the ground G. FIG. 2 shows mobile crane 10 in an operative position wherein the outriggers 30 and 31 are fully deployed and the mobile crane is raised and fully supported by the outriggers.

The outriggers 30 and 31 may, for example, take the form of those shown in U.S. Pat. No. 3,945,666, which is assigned to the same assignee as the present application. As FIGS. 1, 2, and 4 show, each outrigger 30 and 31 includes a pair of oppositely extending outrigger beams 32 which are pivotally secured to carrier frame 11. Each outrigger beam 32 extends across the bottom of the frame 11 and has one end pivotally connected to a side of the frame opposite its direction of extension. When deployed in their outward and downward positions, the outrigger beams 32 assume a criss-cross configuration as shown in FIG. 2. Each outrigger beam 32 comprises an outer beam section 33 and a telescopically related inner beam section 34 which is extendable and retractable within the outer beam section. Both outrigger beam sections 33 and 34 have a hollow rectangular cross-sectional configuration and house a hydraulic motor 29 for extending and retracting the inner beam section. Each outrigger beam section 33 is attached at one end to the frame 11 by a pivot bracket 35 extending downwardly from the frame and is swingable on a pivot pin 36. At its opposite end, the outer beam section 33 is embraced by a yoke 37 which is, in turn, pivotally connected by a pin 40 to a piston rod 41 of a hydraulic motor 44. The motor 44 is supported on frame 11 by trunnions 45.

Telescopic movement is imparted to the inner beam section 34 by the hydraulic motor 29 which is located within hollow beam 34 and which is pivotally connected to one end to the outer beam 33 by a pin 46. Both of the hydraulic motors are double-acting and actuated by conventional hydraulic fluid supplies and control mechanisms (not shown). Vertical movement is imparted by the hydraulic motor 44.

Each telescopic inner beam section 34 has at its end a ground-engaging foot 50 which is pivotally attached by a pivot pin 51 so as to be able to swing downwardly as shown in FIG. 2 when the inner beam section 34 is extended.

As FIGS. 3 and 4 show, carrier frame 11 comprises the forward section 20 and the rear or principal load-bearing section 21 which are rigidly connected together. Forward section 20 generally comprises a pair of longitudinally extending laterally spaced apart girders 55 which are rigidly interconnected by several cross braces 56 and rigid plates 57. The girders 55 are provided with brackets 54 for supporting conventional axle suspension frame assemblies 58 for the forward ground-engaging wheels 13. The girders 55 also support outwardly extending rigid extension members 60 on which the cab 17 and engine enclosure 18 are supported.

Rear or principal load-bearing section 21, which is hereafter described in detail, is provided with laterally outwardly extending rigid extension members such as 62 and longitudinal cross braces 63 which define a framework for supporting a platform 64 on carrier 11 on which components and personnel can be supported. The outriggers 30 and 31 hereinbefore described are supported on the underside of section 21, being connected to outrigger attachment assemblies 66, including pivot brackets 35, which are connected to the opposite lateral sides and near opposite ends of section 21. The outriggers 30 and 31 are thus connected to frame section 21 at four outrigger attachment points designated 67 in FIG. 4. The slew ring 24 of crane upper 22 is connectable to and rotates on the circular bearing ring 70 which is mounted on the upper side of frame section 21. Bearing ring 70 is centered on a point 71, shown in FIG. 4, which is the center of rotation for crane upper 22 and which is located substantially at the center of frame section 21. More specifically, point 71 lies on the longitudinal centerline 73 of carrier frame 11 and is substantially equidistantly between the forward and rear ends of load-bearing frame section 21. Thus, as FIG. 4 shows, when the outriggers 30 and 31 are equidistantly extended and deployed, lines A and C and Lines B and D, which intersect the load-bearing center points of diametrically opposite outriggers 30 and 31, cross each other at the center of rotation point 71. When crane 10 is in operation, and the outriggers 30 and 31 are deployed, location of crane boom 24 along any one of the lines A, B, C, or D while lifting a load, imposes the greatest torsional stresses and buckling forces on frame section 21. As FIGS. 3 through 15 show, the load-bearing frame section 21 comprises longitudinally extending steel plates which are welded together to provide a pair of longitudinally extending interconnected hollow beams 80 which are horizontally spaced apart from each other and located on opposite sides of the longitudinal centerline 73 of the carrier frame 11. More specifically, the load-bearing section 21 of the carrier frame 11 comprises a longitudinally extending single horizontal top plate 81 having a single central aperture 89 for accommodating connections to the crane upper 22 and a pair of longitudinally extending horizontal bottom plates 82 located below the top plate. The bottom plates 82 are horizontally spaced apart from each other and located on opposite sides of the longitudinal centerline 73. Top plate 81 is substantially rectangular but is provided with lateral extensions 86 on opposite lateral sides thereof. The load-bearing section 21 further comprises a pair of horizontally spaced apart vertical outer side plates 87, one on each side of the centerline 73, and a pair of horizontally spaced apart vertically sloped inner side plates 88, one on each side of the centerline 73. Each inner side plate 88 is displaced about 13.5° from the vertical, as shown by angle α in FIG. 9. Both inner plates 88 are located between and spaced from the pair of outer side plates 87. The outer side plates 87 have forward end extensions 87A which adapt frame section 21 for rigid connection as by welding to forward frame section 20. Each beam 80 comprises a portion of the top plate 81, a bottom plate 82, one vertical outer side plate 87, and one sloped inner side plate 88. The side plates 87 and 88 are connected by welding as at W (see FIG. 8) between the top plate 81 and the bottom plate 82 and are thus in edge compression when frame section 21 is loaded. The top edge 90 of each vertically sloped inner side plate 88 is connected to the underside of the top plate 81 at a location 91 which is spaced an optimum distance from the longitudinal centerline 73 of the carrier frame 11. As FIGS. 3, 5, 6, 7, 12, and 15 show, each lateral extension 86 of top plate 81 is strengthened and supported by a pair of triangular support plates 93 which are welded between top plate 81 and an outer side plate 87. The plates 93 are also welded to each other and to a brace 94 which is welded to side plate 87.

Figure 5:
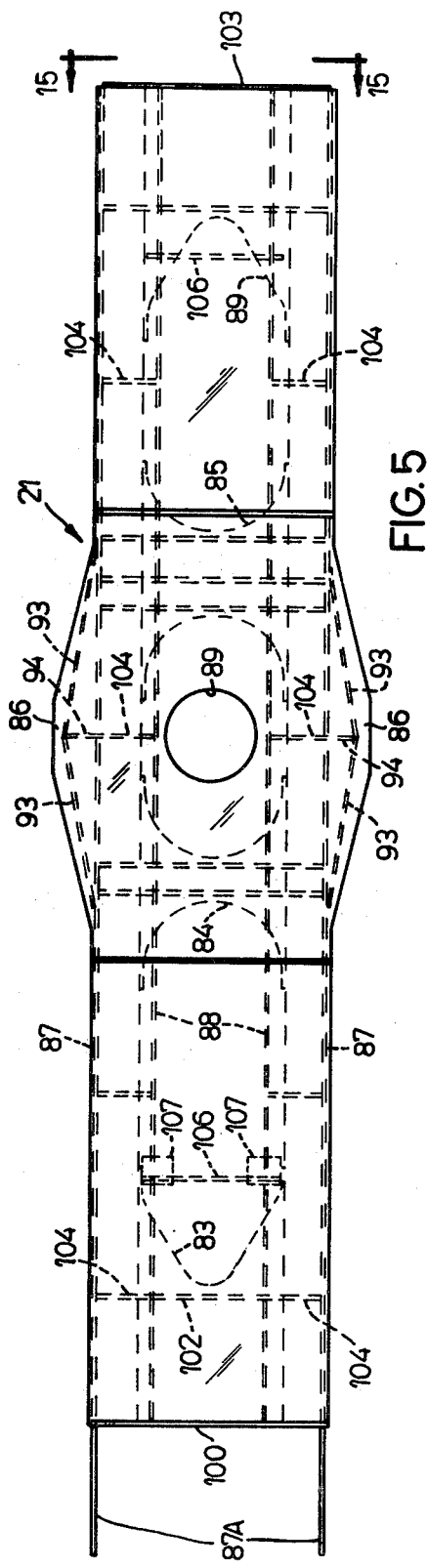
FIG. 5 is an enlarged top plan view of the rear load-bearing section of the carrier frame shown in FIGS. 3 and 4.
Figure 7:
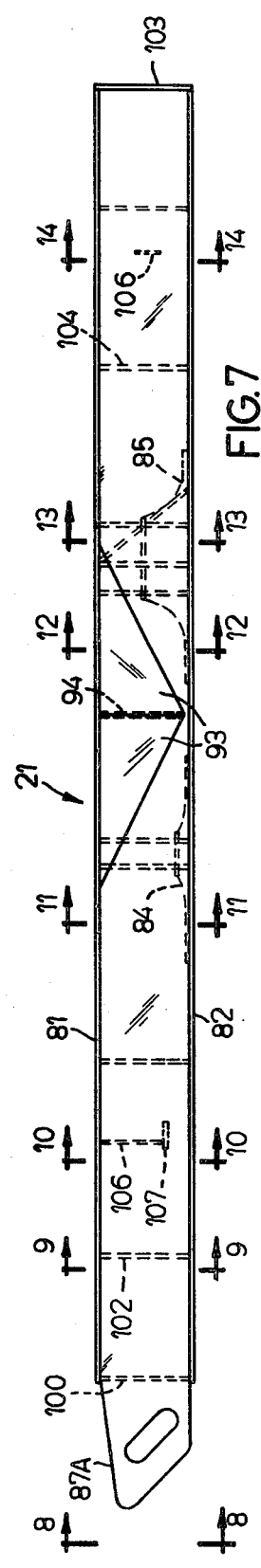
FIG. 7 is a side elevation view of the carrier frame section shown in FIGS. 5 and 6.
Figure 6:
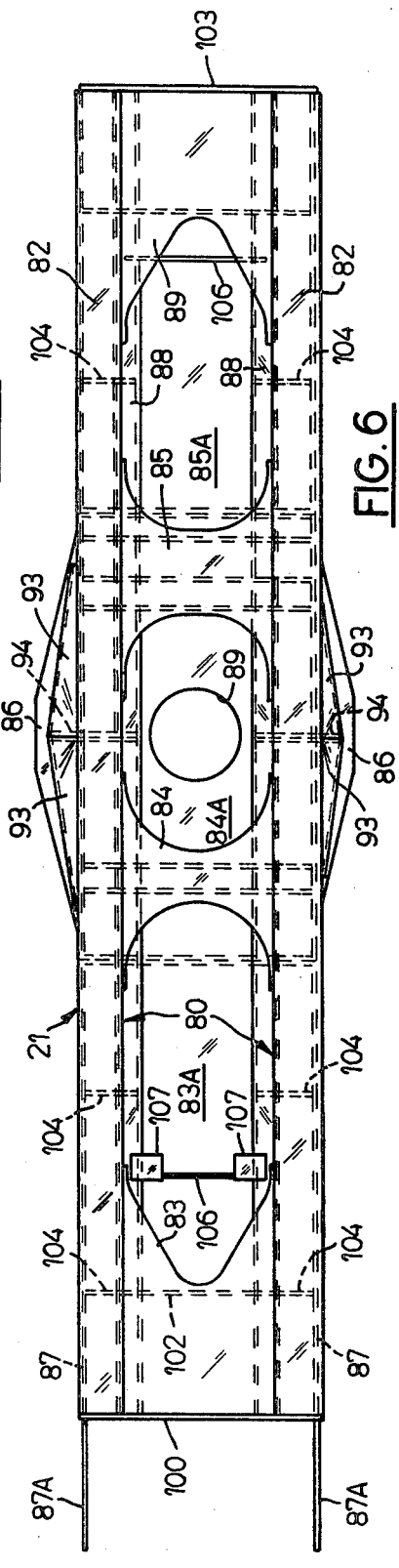
FIG. 6 is a bottom plan view of the load-bearing carrier frame section shown in FIG. 5.

As FIGS. 5, 6, and 7 show, load-bearing frame section 21 also comprises an arrangement of end plates, internal bulkheads, and internal cross braces which, in some cases, serve to further strengthen and rigidify the frame section 21 or, in other cases, to provide supports for various components which are connected to the frame section when it is employed in apparatus such as a mobile crane. Thus, as FIG. 6 shows, four flat plates or webs designated 83, 84, 85 and 89 are edge-welded between the spaced apart bottom plates 82 and define openings 83A, 84A, and 85A which afford access to the space between the beams 80. The webs are substantially thinner than the bottom plates 82 and merely provide supports for components. As FIGS. 8 and 15 show, frame section 21 includes a forward end plate 100 having a circular hole 101 therethrough and an imperforate rear end plate 103. FIGS. 9 through 14 show bulkheads 102 which are welded between inner side plates 88 and to top plate 81. Bulkheads 104 are also welded at intervals within the beams 80. FIGS. 10, 13, and 14 show support braces 106 welded between the inner side plates 88, and the plate 106, shown in FIG. 10, has a pair of spaced apart bracket members 107 secured thereto by welded gussets 108.

In an actual embodiment of an invention, the load-bearing frame section 21 was approximately 238 inches long, measured between its forward end plate 100 and its rear end plate 103 and was about 43 inches wide across the rectangular portions of its top plate. Referring to FIG. 8, the vertical distance between the upper surface of the top plate 81 and the lower surface of the bottom plate 82 was on the order of 18 inches. The width of each bottom plate 82 was about 8 inches. The distance between the top edges 90 of the two inner side plates 88 was on the order of 20 inches and each location 91 was spaced about 10 inches from the centerline 73 of the carrier frame 11. The section 21 weighed about 5210 pounds, or an average of 182 pounds per linear foot. The top plate 81, the outer side plates 87 and the inner side plates 88 were each on the order of 0.375 of an inch thick, whereas the bottom plates 82 were each on the order of 0.750 of an inch thick.

The foregoing arrangement and proportions ensure an optimum balance between the strength, size, and weight of the plate material of the frame section 21 in view of the overall size of the load-bearing section 21 of the carrier frame. The arrangement provides a strong, light-weight carrier frame 21 resistant to buckling under load and having a flat horizontal upper surface on top plate 81 which is well suited for mounting components thereon. Furthermore, the flat vertical side surfaces and the outer side plates 87 are well suited to receive components, such as the ground-engaging wheels 14, closely thereagainst. Also, the longitudinally extending center space 99 between the spaced apart beams 80 and between the top plate 81 and bottom plate 82 is relatively large and well adapted to accommodate components, such as the transmission drive line, pumps, tanks, valves, and hoses which can conveniently be mounted therein.

In addition to the foregoing advantages, a carrier frame in accordance with the present invention resists deflection and remains substantially level during operation. Furthermore, the top plate 80 of the frame section 21 and the vertical outer side plates 87, as well as the sloped inner side plates 88, are in edge compression when the carrier frame is subjected to loads and therefore tend to resist buckling. The top edges 90 of the sloped inner side plates 88 are not connected to the top plate 81 at the longitudinal centerline 73 of the frame 11 but are spaced at an optimum lateral distance, i.e., on the order of 10 inches, from the longitudinal centerline 73 so as to allow a maximum space between the hollow beams 80 for location of the system components and still provide sufficient support for the top plate 81 to prevent buckling of the top plate even under the worst loaded condition of the carrier frame, i.e., when boom 24 overlies a line A, B, C, or D in FIG. 4.

I claim:

1. A vehicle carrier frame for supporting a load near the center thereof and adapted to be supported by outriggers at opposite ends thereof, said carrier frame comprising:

a top plate having a longitudinal centerline;

and a pair of longitudinally extending hollow beams located beneath said top plate on opposite sides of said centerline and spaced apart a predetermined distance from each other, each beam comprising an upper side including a portion of said top plate, a lower side, a vertical outer side, and an inner side which slopes toward said centerline, each vertical outer side and each inner side being connected to and between said top plate and a lower side, said outer sides and said inner sides of said beams adapted to be in edge compression when said carrier frame is supporting a load.

2. A carrier frame according to claim 1 wherein the lower side of said beams is thicker than each of said inner sides, said outer sides and said top plate.

3. A carrier frame according to claim 2 wherein the minimum distance between said beams is substantially equal to the width of a vertical outer side.

4. A carrier frame according to claim 3 wherein said inner sides, said outer sides and said top plate are of substantially the same thickness.

5. A carrier frame for a vehicle comprising:

a top plate having an upper surface and a lower surface and having a longitudinal centerline;

a pair of spaced apart bottom plates spaced below said top plate and located on opposite sides of said centerline, each bottom plate having an upper and lower surface;

a pair of vertically disposed spaced apart outer side plates located on opposite sides of said centerline, each outer side plate having top and bottom edges and connected to and between the lower surface of said top plate and the upper surface of one of said bottom plates;

and a pair of sloped spaced apart inner side plates disposed between and spaced from said pair of outer side plates and located on opposite sides of said centerline, each inner side plate having top and bottom edges and connected to and between the lower surface of said top plate and the upper surface of one of said bottom plates;

said outer and inner side plates being in edge compression when said frame is loaded.

6. A carrier frame according to claim 5 wherein said top plate, said outer side plates, and said inner side plates are of substantially the same predetermined thickness and wherein said bottom plates each have a thickness greater than said predetermined thickness.

7. A carrier frame according to claim 6 wherein each bottom plate is substantially twice the thickness of said predetermined thickness.

8. A carrier frame according to claim 6 wherein the distance between the top edges of an outer side plate and an inner side plate is substantially equal to the distance between the top edge of said inner side plate and said centerline.

9. A carrier frame according to claim 8 wherein the distance between the top and bottom edges of an outer side plate is substantially equal to the distance between the top edges of said pair of inner side plates.

10. In a mobile crane:

a vehicle carrier frame having a load-bearing section;

ground-engaging wheels mounted on said carrier frame;

a rotatable crane upper mounted on said load-bearing section of said carrier frame near the center thereof;

and extendable and retractable outriggers connected to said load-bearing section of said carrier frame near opposite ends thereof;

said load-bearing section of said carrier frame comprising:

a top plate having a longitudinal centerline;

and a pair of longitudinally extending hollow beams located beneath said top plate on opposite sides of said centerline and spaced apart a predetermined distance from each other, each beam comprising an upper side including a portion of said top plate, a lower side, a vertical outer side, and an inner side which slopes toward said centerline, each vertical outer side and each inner side being connected to and between said top plate and a lower side.

11. A carrier frame according to claim 10 wherein the lower side of said beams is thicker than each of said inner sides, said outer sides and said top plate.

12. A carrier frame according to claim 11 wherein the minimum distance between said beams is substantially equal to the width of a vertical outer side.

13. A carrier frame according to claim 12 wherein said inner sides, said outer sides and said top plate are of substantially the same thickness.

* * * * *